United States Patent [19]
Anderson et al.

[11] Patent Number: 5,031,157
[45] Date of Patent: Jul. 9, 1991

[54] COLOR SONAR FOR UNDERWATER OBJECT COLLISION AVOIDANCE

[75] Inventors: Robert M. Anderson; Rod A. McLennan, both of San Diego; Robert J. Vachon, El Cajon, all of Calif.

[73] Assignee: The United States of Americas as represented by the Secretary of the Navy

[21] Appl. No.: 259,983

[22] Filed: Oct. 11, 1988

[51] Int. Cl.[5] .............................................. G01S 15/00
[52] U.S. Cl. ..................................... 367/110; 367/909
[58] Field of Search ................ 367/110, 909; 342/181, 342/439

[56] References Cited

U.S. PATENT DOCUMENTS

| | | | |
|---|---|---|---|
| 3,031,660 | 4/1962 | Young | 342/181 |
| 3,845,462 | 10/1974 | Blue et al. | 367/110 |
| 3,886,487 | 5/1975 | Walsh et al. | 367/92 |
| 3,986,160 | 10/1976 | Turner | 367/110 |
| 4,179,681 | 12/1979 | Zehner et al. | 367/110 |
| 4,308,599 | 12/1981 | Thiele | 367/110 |
| 4,682,177 | 7/1987 | Shimizu | 367/109 |

*Primary Examiner*—Daniel T. Pihulic

*Attorney, Agent, or Firm*—Harvey Fendelman; Thomas G. Keough; Peter A. Lipovsky

[57] ABSTRACT

A method and apparatus for presenting elevation angle information with respect to overhanging objects to an operator of a submersible incorporates a substantial portion of the sonar equipment found onboard conventional submersibles. Reflections of radiant energy from the objects are received by a highly directional array of hydrophones. The received reflections are time varying gain attenuated to substantially compensate for range-dependent signal variations such as are due to changes in scattering areas, spreading loss and attenuation loss. Using time varying gain processing and by taking into account the known directivity pattern of the hydrophones, the received reflections are reduced to represent signal characteristics due substantially to the elevation angle of the incoming reflections. These modulated reflections are quantized by first sorting the reflections into bands according to amplitude intensity and then by assigning a distinct color to the individual bands. The quantized reflections are then converted into color display signals according to their assigned colors, and the signals are displayed upon a color visual display to reveal object elevation angle information as distinct shades of color.

6 Claims, 4 Drawing Sheets

COLOR SONAR FOR UNDERWATER OBJECT COLLISION AVOIDANCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention pertains generally to acoustic wave communication. More particularly, the invention relates to sonar systems. In greater particularity, the invention pertains to acoustic image conversion as it relates to time varying gain sonar.

2. Description of the Related Art

Submarines navigating underice have relied on monochromatic sonar systems to provide them with a visualization of objects to be avoided. Traditional systems have included phosphor cathode ray tubes that are sensitive to ambient light variations, making range, bearing and elevation information, regarding ice ridges and the like, vulnerable to being obscured or otherwise less readable. Many of these sonar setups rely upon increasing shades of brightness to indicate respectively higher degrees of hazard associated with approaching an underwater ridge or peak.

These levels of brightness often indicate the clearance that exists between the top of the vessel and the lowest extent of the approached ice ridge. Navigators determine whether this clearance is increasing or decreasing by observing changes in the brightness levels. With sonar systems of this kind, the navigator-operator must visually discern and commit to memory these changes as his vessel advances.

Monitoring these often subtle changes strains the operator and can increase his fatigue and possibility of poor judgement. In addition, if the ambient light level in the sonar console compartment is changed, such as due to changing operational conditions, for example, then the relative magnitudes of displayed brightness have an apparent change to the operator's eyes, so that a truly hazardous obstacle may not be recognized as such. The effects of fatigue and strain on the operator are sped up, and the risk of disastrous collision is increased.

Thus there is a continuing need in the state of the art for a sonar display that provides an operator with a portrayal of underwater obstacles that is easy to understand, not sensitive to ambient lighting and that can convey meaningful information for responsive action.

SUMMARY OF THE INVENTION

The invention is directed to a method of displaying sonar navigational information in color. The invention incorporates a substantial portion of the sonar equipment found on board conventional submersibles. For example, conventional sonar projectors are used to project acoustic energy over a large forward section of an underwater region so as to illuminate objects forward of the submersible. A highly directional array of hydrophones, as are known and used in the art, are used to receive returned acoustic energy in the form of sonar echoes or reflections.

Time varying gain, as is known and established in the art, is employed to substantially compensate for range-dependent signal variations, such as are due to changes in scattering area, spreading loss and attenuation loss.

Further, as is established in the sonar art, the known directivity pattern of the hydrophones is used in conjunction with the time varying gain processing so that the received sonar reflections are reduced to represent signal characteristics due substantially to the elevation angle of incoming reflections.

In accordance with a preferred embodiment of the invention, these modulated reflections are quantized by first sorting the reflections into bands according to amplitude intensity, and then by assigning a distinct color to the individual bands. The quantized reflections are then converted into color display signals according to their assigned colors, and the signals are displayed upon a color visual monitor to reveal object elevation angle information as distinct shades of color.

In accordance with the invention, high amplitude return signals, due to a reflection from an object at a low elevation angle with respect to the submersible and indicating a high degree of threat of collision of the vessel with the object, are coded in the color red. Returned reflections of slightly lesser amplitudes, such as may be received from an object at a elevation angle indicating a minimal clearance between the object and the submersible, is presented in the color yellow. Lesser degrees of signal intensity indicating correspondingly greater elevation angles of the received reflections and lesser degrees of threat of collision are assigned the colors of green and blue, respectively. These distinct colors are easily discernible, and the transition from one color to the next can be easily remembered.

The sonar system is calibrated by adjusting the receiver gain such that a "fade" or transition in displayed color, such as from blue to black (no display), occurs at a preselected elevation and range. The operator then observes the range at which a color transition takes place to accurately predict elevation clearances of forward objects.

This prediction is made by converting the displayed color into its corresponding elevation angle and then using this angle and the known range to calculate the clearance through standard straight line geometry techniques.

By displaying the sonar output to the operator so that a wide angular azimuth sector is presented, the operator can pilot his boat under or around objects projecting downward from the ocean surface. As the operator approaches an overhanging object, the elevation angle from the submersible to the object will increase and the reflection amplitude or strength will decrease. This transition will be indicated to the operator by a change in the color coded elevation angles such as from yellow indicating a high degree of hazard of collision, to green and then blue, indicating respectively lesser degrees of hazard. Maneuvers are required to avoid colliding with a object forward of the vessel if the displayed elevation angles do not undergo an expected color change before a minimal preselected range is reached.

OBJECTS OF THE INVENTION

It is an object of the invention to reduce the hazards associated with underwater submersible transit.

Another object of the invention is to provide a sonar display that is not sensitive to ambient lighting.

Another object of the invention is to provide a sonar display that presents navigational information in easy to remember format.

Yet a further object of the invention is to provide a sonar display that provides an operator with a reduced fatigue presentation.

And still yet another object is to provide a sonar display in various colors to aid understanding.

Still another object is to provide a display that provides color coded three-dimensional navigational information in real time for obstacle avoidance.

Yet a further object is to provide a color display of downwardly extending obstacles so that an operator of a submersible can take effective evasive maneuvering to avoid collisions with said obstacles.

Yet still a further object to the invention is to provide for reducing the hazards associated with underwater, underice maneuvering.

These and other objects of the invention will become more readily apparent from the ensuing specification and claims when taken in conjunction with the attached drawings.

DESCRIPTION OF THE PREFERRED EMBODIMENT

Figure 1:
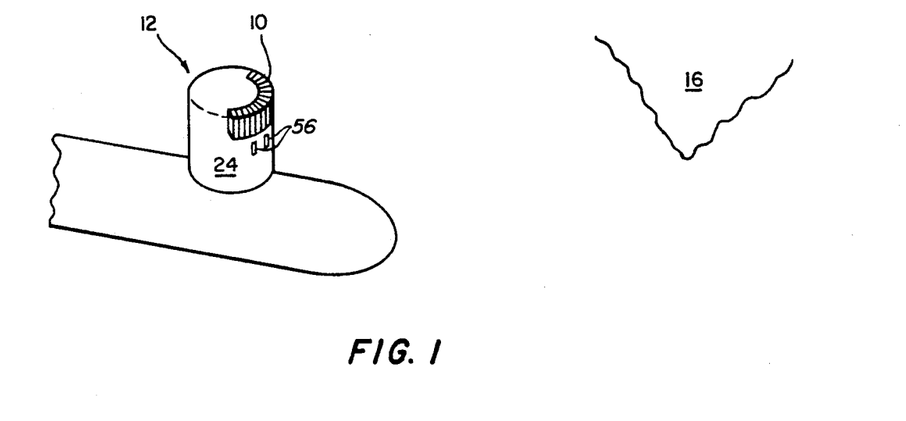
FIG. 1 is a view of a submersible approaching an overhanging underwater object, such as an ice pack.

In FIG. 1 an array of hydrophones 10 is shown attached to a platform such as the submersible craft or vessel 12. Array 10 is made up of a plurality of horizontally disposed, vertical hydrophone staves arranged in close proximity to receive acoustic echoes or reflections from objects over a wide azimuth sector of an underwater region. Acoustic energy, emanating from either acoustic projectors 56 attached to platform 12 or from a remote source, not shown, is used to irradiate a preselected sector of an underwater region. Within this sector, a vertically extending obstacle 16, such as an ice pack, will return the radiant energy upon the radiant energy receivers or hydrophones 10.

Figure 2:
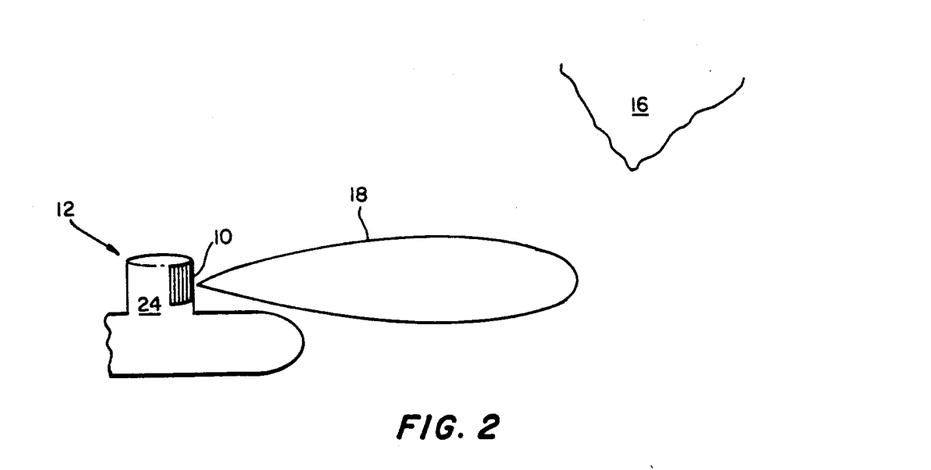
FIG. 2 is a view like that of FIG. 1 in which a representative hydrophone directivity pattern is shown.

Referring now to FIG. 2, a highly directive vertical receiving beam or directivity pattern 18 of a hydrophone of hydrophone array 10 is shown. In accordance with established techniques, the known characteristics of this directivity pattern is coupled with time varying gain processing to give an operator or navigator of platform 12 elevation angle information with respect to platform 12 and the object or obstacle 16.

Figure 3:
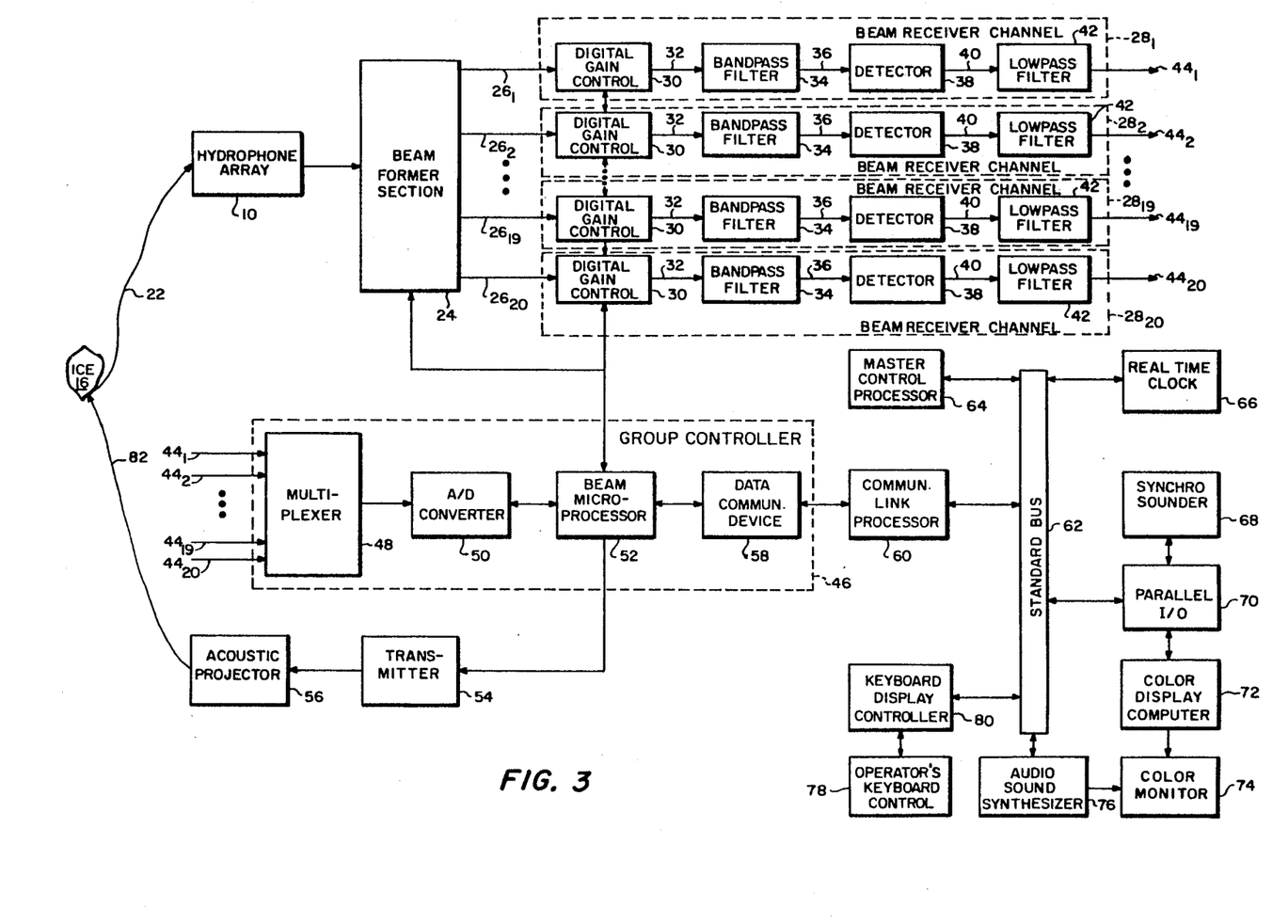
FIG. 3 is a schematic block diagram of the sonar system in accordance with the invention.

Referring to FIG. 3, a block diagram schematic of the elements of the color sonar of the invention is shown. These elements will first be introduced individually and will then be followed by a description of their operation in relation to other system components.

Hydrophone array 10 receives radiant energy 22 reflected from vertically extending object 16. In a preferred embodiment of the invention, the hydrophone array comprises 60 elongate hydrophone staves disposed laterally adjacent each other and horizontally about an arcuate backing such as a forward portion of a sail 24, shown in FIGS. 1 and 2. Arranging the individual hydrophone staves in this manner provides a wide angle reception of the incoming radiant energy 22.

Of course, the precise number of hydrophones used is not pertinent to the invention providing that the hydrophone or hydrophones are placed in the ocean where radiant energy reflected from a target is likely to or is expected to be found. These hydrophones may be of conventional type, such as those used to convert acoustic pressures sensed thereon into electrical signals, such as voltage.

By an appropriate switching network, an operator of submersible 12 selects forward, left or right sectors of the 60 hydrophone array to "see" radiant energy emanating from the selected sector. The converted radiant energy, in the form of electrical signals, passes from hydrophone array 10 to a beamformer section 24.

Here, the hydrophone outputs are input into individual switch amplifiers included within beamformer section 24. Thirty-nine elements of the 60 incoming hydrophone inputs are passed to these switch amplifiers based upon the given sector selected by the operator. These switch amplifiers are identical, and may be, for example, Harris Programmable Operational Amplifiers operationally connected as non-inverting 26.5 dB gain amplifiers. The output of these 39 switch amplifiers is then passed to 20 beamformers within beamformer section 24.

Each of these 20 beamformers is arranged to take 20 consecutive switch amplifier outputs from the total of 39 amplifier outputs. That is to say, for example, beamformer number one takes switch amplifier outputs one through 20. Beamformer number two takes switch amplifier outputs two through 21, and so-on and so-forth.

By this arrangement, and by the physical spacing of the individual hydrophone staves, each beamformer forms a horizontal beam of about four degrees azimuth coverage that overlaps adjacent beams at about the two decibel point of the beam's shape. By the physical spacing of the hydrophones and by the beam shape overlap, a wide azimuthal reception area is provided to the sonar operator.

In this application, beamforming may be done by the well understood phase compensation method documented and described by R. P. Kempff in "Simultaneous Multibeam Phase Compensation: XII. Beam Formation with Linear, Circular and General Arrays by Phase Compensation: Summary as of 1962".

Referring again to FIG. 3, the output of each beamformer, designated as $26_1$ through $26_{20}$, passes to individual receiver channels $28_1$ through $28_{20}$. Beamformer outputs $26_1$ through $26_{20}$ are directly connected to the input of a digital gain control 30, individual to receiver channels 28. These digital gain controls may be, for example, Analog Devices AD7111 logarithmic D/A converters capable of attenuating analog input signals over the range of 0 to 88.5 decibels in 0.375 decibel steps. A more precise description of the operation of digital gain control 30, as it relates to the color sonar of the invention, will be made below.

Attenuated signals 32 emerge from digital gain controls 30 to be passed to bandpass filters 34. Each bandpass filter limits the frequency of the corresponding attenuated signal to expected echo frequencies. A filter that performs satisfactorily for this purpose consists of three cascaded Burr Brown UAF41 universal active filter devices each configured as a two-pole bandpass filter with noninverting input.

Bandpass filtered signals 36 pass to individual full wave rectifiers or detectors 38. In a well understood manner, these detectors separate undesired noise from the signals and remove the carrier frequency from the signals.

The detected signals 40 are then passed to an averager or low pass filter 42, individual to receiver channels 28. By performing an averaging function, the low pass filter further reduces noise within the signal. The 20 received signals $44_1$ through $44_{20}$ then pass from the receiver channels to a group controller 46.

At the front of group controller 46 is a multiplexer 48 that sequentially selects, one by one, each of the 20 receiver channel output signals, $44_1$ through $44_{20}$. Multiplexer 48 presents the beam channel data to an analog-to-digital converter 50. Analog-to-digital converter 50 serves to convert the analog signal voltages into parallel digital bytes suitable for further processing.

Multiplexer 48 and analog-to-digital converter 50 are commercially available as a unit such as a National ADC0816 multiplexer/A/D converter.

The parallel digital bytes from A/D converter 50 are next handed over to a beam microprocessor 52. Beam microprocessor 52, such as, for example, an Intel 8748H microcomputer, performs a variety of functions that will be discussed in detail below. In summary, beam microprocessor 52 is programmed to process parallel digital amplitude information from each of the 20 beam receiver channels. Further, beam microprocessor 52 controls the attenuation of the 20 received beams by adjusting each of the digital gain controls 30. Additionally, beam processor 52 sends preselected transmit parameters to a transmitter 54 which in turn dictates the specific radiant energy emanations from active acoustic projector 56, also shown in FIG. 1. Finally, beam processor 52 passes the processed received signals $44_1$ through $44_{20}$ onto a data communication device 58 in which the parallel digital bytes of the 20 signals are converted into a serial data stream which is passed on for processing by further system components. Data communication device 58 may be, for example, a Signetics SCN2681A dual universal asynchronous receiver transmitter (DUART).

The first of the system components to receive the output of group controller 46 is a communication link processor 60. Communication link processor 60 may be, for example, an Intel 8748H microprocessor. In accordance with the invention, communication link processor 60 processes the beam amplitude samples from group controller 46 by quantizing these signals.

This quantization involves a two-step process beginning with the sorting of the returned sonar samples into bands or steps according to signal amplitude. An embodiment of the invention included steps of six decibels each.

These steps are then assigned colors, in which, for example, black or no color may represent a returned signal of zero or little amplitude and blue, green, yellow and red may represent returned signal of respectively increasing amplitudes. Communication link processor 60 bins the sorted incoming signals into bins designated with these preselected colors. A greater detailed account of the communication link processor 60 will be made below, where system operation will be described.

From the communication link processor 60 the processed signals are sent to a standard bus 62 to be accessible to other system components. One of these system components is a master control processor 64.

Master control processor 64 acts as overall system controller and is made up of a programmable processor operably coupled to a central processing unit and memory storage. Commercially available items that have worked well for this purpose and which may be used in accordance with this invention are a Pro-Log model Z80 processor, a Pro-Log model 7804A-0 Z80 CPU card, two 2732A 8K erasable programmable read-only memories (EPROM) and one HM6116LP-2 2K static random-access memory chip (RAM), these elements being connected in accordance with established techniques.

Master control processor 64 is programmed to perform a wide variety of system functions each of these to be discussed in detail below, where system operation will be described. Also below the processing of master control processor 64 will be disclosed.

Standard bus 62 provides a common highway for signals from communication link processor 60, master control processor 64, as-well-as from a real time clock processor 66.

Real-time clock processor 66 provides coordinated date and time information to the sonar system. Clock processor 66 may be, for example, an OKI MSM 5832 microprocessor real-time clock/calendar integrated circuit. An Intel 8748H microprocessor operably coupled to the clock may be used to interrogate and set the clock. Address decoding may be done by, for example, a suitably coupled 74LS42-BCD-to-decimal decoder and a 74LS139 1-or 4 decoder/demultiplexer. Of course a variety of means for deriving and injecting time information into the sonar system of the invention are available.

Ship synchro information such as speed, course, trim and depth are provided to the sonar circuitry through a synchro sounder processor 68. A processor that may be used for this purpose, for example, is an Intel 8748H microprocessor. Further details as to the workings of synchro sounder processor 68 will be provided in the discussion on the system operation below. Synchro sounder processor 68 is connected to standard bus 62 by way of a parallel input-output 70.

Parallel input-output 70 is connected to standard bus 62 as an interface between master control processor 64 and other external devices such as processor 68. Input-output 70 extracts complex data from bus 62, and presents this data as parallel eight bit words to be used by the external devices. It also performs the reverse function by accepting an eight bit digital word and presenting the word in correct format to bus 652. A device that has performed satisfactorily for this purpose, for example, is an appropriately coupled Pro-Log model 7605-1 programmable transitor-transitor logic (TTL) input-output card in which the stock furnished 7407 non-inverting circuits are replace by 7406 hex inverter buffer/drivers. An additional external device coupled to standard bus 62 through parallel input output 70 is a color display computer 72.

Color display computer 72 generates color video display signals to be used in conjunction with a color monitor display 74. A color display computer that may be used to generate these signals is, for example, a Motorola MC6809 supported by and operationally coupled to a synchronous address multiplier such as a Motorola MC6883 and a video display generator such as a Motorola MC6847. Details as to the programming of color display computer 72 will be disclosed below.

The color monitor or display 84 is a conventional unit such as a Panasonic model CT-110M monitor designed for use with composite video signals.

Also connected to standard bus 62, to be responsive to signals therein, is an audio sound synthesizer 76. Sound synthesizer 76 is used in a manner well understood in the sonar arts as a sound synthesizer that generates chirp and tone signals in response to returned sonar signals of preselected values. These chirp and tone signals are sent to color monitor 74 where a loudspeaker contained therein makes the chirps and tones audible. As is common in the sonar arts, both audible and visible presentations are made to the operator to given him sonar feedback information in two communication modes.

The exact makeup of audio sound synthesizer 76, as-well-as real-time clock processor 66 and synchro sounder processor 68, is not overly critical to a full understanding of the present invention, however these elements have been included to typify the best mode in which the invention may be utilized.

Operation interaction with the sonar system is made through an operator's keyboard control 78. In a preferred embodiment of the invention, keyboard control 78 contains keypad buttons, switches and an LED alpha-numeric display. A keyboard display controller 80, operationally coupled to standard bus 62, is used as an interface between the keyboard control 78 and master control processor 64. Keyboard display controller 78 may be, for example, an Intel 8748H microprocessor operationally interfaced to the bus through an 8255A programmable peripheral interface. Peripheral hardware for the 8748H includes memory in the form of a RAM 2048×8 such as a CDM6226AE3 and an EPROM 4096×8 such as a 2732A as-well-as an address decoder such as PA012L4CN. All of these circuit elements are commercially available and are connected in accordance with established techniques. The specific program functions of keyboard display controller 80 will be disclosed in greater detail below.

System operation begins by powering-up the system with onboard power. The operator interfaces with the sonar system by way of the operator's keyboard control 78. As discussed above, keyboard control 78 and master control processor 64 are interfaced by programming within keyboard display controller 80. This programming permits the entry of operator selected sonar parameters so that system parameters required to control the sonar system are obtained. The operator inputs are acquired by way of the keypad and switches on the keyboard control 78. These inputs are decoded to determined feedback, which is provided in the form of a message sent to the LED display on the keyboard control. In this manner, a dialogue is carried on with the operator to acquire system parameters such as active (transmit) mode or passive (receive) mode, sector selection such as left, right or center hydrophone sectors, mode selection such as wide or narrow beam, range scale to be used, gain settings, and transmission parameters such as ping frequency and duration. Further, the real-time clock processor 66 can be set by way of the operator's keyboard control 78.

The processor within keyboard display controller 80 scans the operator's keyboard control for system parameter changes, controls the keyboard LED display, stores the existing system combination of setup parameters as well as stores preset combinations thereof, and communicates with the master control processor 64 by sending system parameter data and receiving messages for display via standard bus 62.

A suitable computer program for the keyboard display controller 80 by way of example could utilize source code written in 8748 assembly language. It is to be understood however other programs may be utilized within the scope of the present invention.

Master control processor 64 acts as an overall system controller. It reads the keyboard setup parameter and sends the setup command words to group controller 46. It read beam output data from the beam receiver channels by way of the communication link processor 60. Master control processor 64 further reads digitized synchro data from the synchro sounder processor 68 as-well-as reads time and date data from real-time clock processor 66. Both of these "reads" are "written" to the color display computer 72 through standard bus 62.

Master control processor 64 runs in a continuous cycle to query keyboard entries. For example, sector switch inputs are monitored and an appropriate sector command is sent to the color monitor. Notation data from the synchro sounder processor, sector switch, real-time clock processor, as-well-as ping parameters are gathered together and sent to the color monitor for visual display. Sonar echo data is received from group controller 46 by way of communication link processor 60 and is transferred to the color monitor and audio sound synthesizer using data format dependent upon the range scale selected. Clock set parameters are sent to the real time clock processor if required to complete pin cycle control. This process is continuously repeated.

A suitable computer program for the master control processor 64 by way of example could utilize source code written in Z 80 FORTH language. It is to be understood however other programs may be utilized within the scope of the present invention.

Synchro sounder processor 68, which provides ship course, trim, speed and depth information to the operator via color monitor 74, is used to read angles from conventional synchro-to-digital converter modules that digitize synchro voltages and that calculate the corresponding angle positions of the synchro rotors.

The synchro sounder processor interpolates speed data, scales the data in terms of ship parameters, and then sends the data to master controller processor 64 when interrogated by the processor to do so. Depth data from ship sounders are also input to the synchro sounder processor. The processor converts this data to a depth number and sends it along with the synchro data. This synchro depth data is sent by way of the master control processor 64 to color display computer 72.

A suitable computer program for the synchro sounder processor 68 by way of example could utilize source code written in 8748 assembly language. It is to be understood however other programs may be utilized within the scope of the present invention.

Referring again to FIG. 3, color display computer 72 is programmed to read, through parallel input-output interface 70, the synchro output data collected within master control processor 64. Computer 72 displays this data in display fields on color monitor 74. Color display computer 72 is further programmed to generate and display a green frame surrounding a sonar B-scan format area as-well-as alpha numeric characters describing the ship position and motion parameter fields. As directed by master control processor 64, color computer 72 also reads sonar beam and synchro output data from the parallel input-output interface 70 with the master controller and displays this data on the monitor 74.

A suitable computer program for the color display computer 72 by way of example could utilize source code written in 6809 FORTH language. It is to be understood however other programs may be utilized within the scope of the present invention.

Turning now to the greater details of the transmit and receiving functions of the color sonar of the invention, these functions begin with operator input going to master control processor 64 by way of keyboard control 78 and keyboard display controller 80. As discussed above, the operator selects the range scale at which sonar contacts are expected to be made, the vertical beam width in narrow or wide mode, receiver gain (the adjustment of which will be discussed), active or passive mode and the transmit frequency when active mode has been chosen. These selections, upon first being passed to master control processor 64, are passed in parallel digital bytes to communication link processor 60. The multi-functioned communication link processor 60 converts the parallel digital bytes into a serial data stream. This stream is passed to data communication device 58 which, being a dual universal asynchronous receiver transmitter, converts the serial data into parallel data so that master control processor 64 can intelligently communicate with beam microprocessor 52.

Beam microprocessor 52, as discussed above, performs a variety of functions such as directing the selection of switch amplifiers in beamformer section 24 according to the operator selected sector, directing the selection of transmitter frequencies and transmission pulse times as-well-as setting common receiver gain for receiver gain controls 30. Beam microprocessor 52 additionally samples incoming beams and digitizes this input for further system processing.

A suitable computer program for the beam microprocessor 52 by way of example could utilize source code written in 8748 assembly language. It is to be understood however other programs may be utilized within the scope of the present invention.

In the active mode, beam microprocessor 52 directs transmitter 54 to generate acoustic emanations 82 which are broadcast by acoustic projector 56, also shown in FIG. 1. Obstacles such as the ice pack 16, located within an ensonified sector of a forward underwater region, reflect the projected acoustic energy to form return echoes 22 to be received by hydrophone array 10. Beam microprocessor 52 directs beamformer section 24 to select the appropriate switch amplifiers therein according to the operator selected azimuth sector. As discussed above, beamformer section 24 contains 20 individual beamformers. Each of these beamformers corresponds to 20 of the 39 switch amplifiers in an overlapping fashion, so as to cover a wide azimuth area.

Each beamformer constructs a preformed received beam that is passed to digital gain controls 30 of receiver channels 28. Digital gain controls 32 are controlled by beam microprocessor 52 in such a way that range-dependent signal amplitude changes, caused by changes in scattering area, spreading loss and attenuation loss, are substantially eliminated. By implementation of this time varying gain process, the elevation angle of the object 16, with respect to for example hydrophone array 10, can be implied substantially irrespective of the range at which the echo occurs.

The equation for the amplitude of an echo returned from an object such as ice, expressed in decibels, is given by $$E(t) = S_T = N_{PL} + G(t) + F(\Lambda) + K \quad (1)$$

where t is two-way acoustic travel time to the ensonified object, $S_T$ is the target strength of the object (in dB), $N_{PL}$ i the two-way propagation loss to the object, $G(t)$ is the time varying gain of the sonar system, $F(\Lambda)$ is the vertical beam directivity pattern function of the system, and K is a constant which represents nonvariable system parameters such as fixed gain, source level, and receiver sensitivity.

The time-varying gain function implemented in the color sonar of the invention is (in dB)

$$G(R) = 30 \cdot \log(R) + 2 \cdot \alpha \cdot R,$$

where R is range and $\alpha$ is the attenuation of sound in water (dB/yard), in this case seawater.

Since range is related to the two-way travel time by $$R = ct/2,$$

where c is the speed of sound in water, then $$G(t) = 30 \cdot \log(ct/2) + 2 \cdot \alpha \cdot (ct/2). \quad (2)$$

Objects such as ice are modeled as a reverberation-like phenomenon, that is, one consisting of contributions of a large number of scatterers of random phase and amplitude. As such, the "target strength" ($S_T$) varies as the area ensonified.

When typical ice objects are considered ensonified at a low grazing angle (less than 30 degree from the horizon), the ensonified area is approximated well by the product of the range resolution (a fixed number) and the cross range resolution (which is proportional to range). This can be expressed by $$S_T = 10 \cdot \log(t) + C, \text{ where C is constant.} \quad (3)$$

The two-way propagation loss is modeled as spherical spreading plus acoustic absorption in water, in this instance seawater, that is, $$N_{PL} = 40 \cdot \log(ct/2) \cdot 2 \cdot \alpha \cdot (ct/2) \quad (4)$$

substituting equations (2), (3) and (4) into equation (1) yields:

$$E(t) = 10 \ \log(t) - [40 \cdot \log(ct/2) + 2 \cdot \alpha \cdot (ct/2)] + [30 \cdot \log(ct/2) + 2 \cdot \alpha \cdot (ct/2)] + F(\theta) + K.$$

By adjusting the value of the constant term K, this equation reduces to $$E(t) = F(\theta) + K.$$

Thus the strength of an echo from an object such as ice is a function only of the elevation angle ($\theta$) to the object.

This reasoning is used to create range bins that reflect time varying gain adjusted signal levels as a function fo range. A preferred embodiment of the invention time increments a plurality of range bins created at preselected time increments of the sonar range. Each one of these increments is gain adjusted so that the plurality of increments, as a whole, approximates a continuous attenuation function.

Beam microprocessor 52 has this time varying gain information stored in an operationally coupled "look-up" table taht it can refer to in terms of what the attenuation should be at a range increment. This "look-up" table may be, for example, an Intel 2732A ROM chip.

Figure 4:
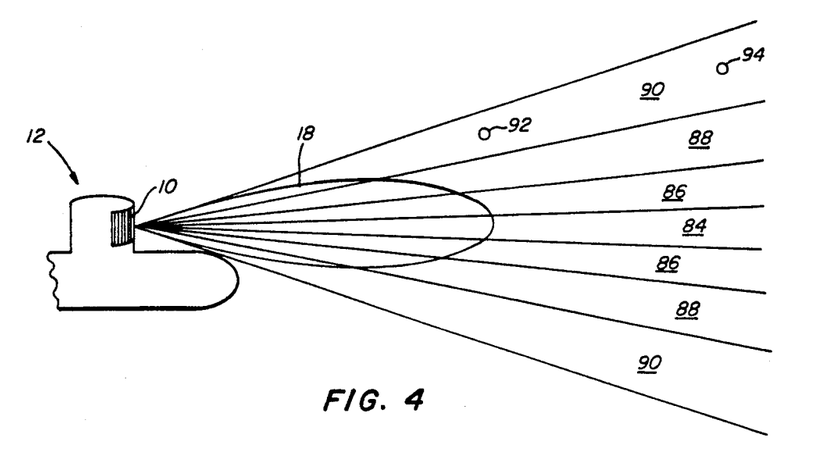
FIG. 4 is a view like FIG. 2 in which the hydrophone directivity pattern is shown divided into arcs of elevation angles.

Referring to FIG. 4, there is a view of submersible 12 with hydrophone array 10. Directivity pattern 18 of array 10 is shown graphically to be divided by arcs of preselected elevation angles, 84 through 90. Time varying gain adjustment of received reflections from objects such as 92 and 94 substantially removes signal amplitude changes due to the different ranges of the objects 92 and 94, and equates them within the same elevation angle arc 90.

Referring again to FIG. 3, beam microprocessor 52 adjusts digital gain controls 30 and passes the now attenuated received beams 32 to bandpass filter 34, detector 38 and lowpass filter 42, respectively. As discussed above, these three elements serve to discriminate between undesired reception and expected reception.

Signals $44_1$ through $44_{20}$, from the twenty receiver channels $28_1$ through $28_{20}$, are input into multiplexer 48. Multiplexer 48, serving as a selector switch, selects each of the twenty receiver channel outputs, one by one, and presents the selected beam channel to the analog-to-digital converter 50. Analog-to-digital converter 50 converst the analog voltage beams from multiplexer 48 into parallel digital bytes suitable for processing by beam microprocessor 52. Beam microprocessor 52 then sends the parallel digital amplitude information on each of the twenty receiver channels to the data communication device 58.

Data communication device 58 converts the parallel digital byte information into a serial data stream which flows back to communication link processor 60.

Communication link processor 60 quantizes the attenuator modulated signals coming from group controller 46 by sorting the signals into bands based upon signal strength/amplitude and by assigning one of a plurality of distinct colors to each of the bands.

In a preferred embodiment of the invention these bands were created in six decibel steps with black or no color representing a zero level; blue representing a first six decibel step; green for a second six decibel step; yellow for a third six decibel step and red for a fourth six decibel step, red representing received reflections of the highest amplitude.

Appendix VII comprises a source code listing for communication link processor 60 provided in 8748 assembly language and given by way of example for use in implementing the program for operating processor 60.

The color information from communication link processor 60 is passed to color display computer 72 by way of master control processor 64. Color display computer 72 constructs a B-scan electronic pattern which, when fed to color monitor 74, generates a color display showing data from each of the twenty receiver channels in vertical columns, each receiver representing an independent and contiguous horizontal bearing with target range being displayed vertically.

Figure 5:
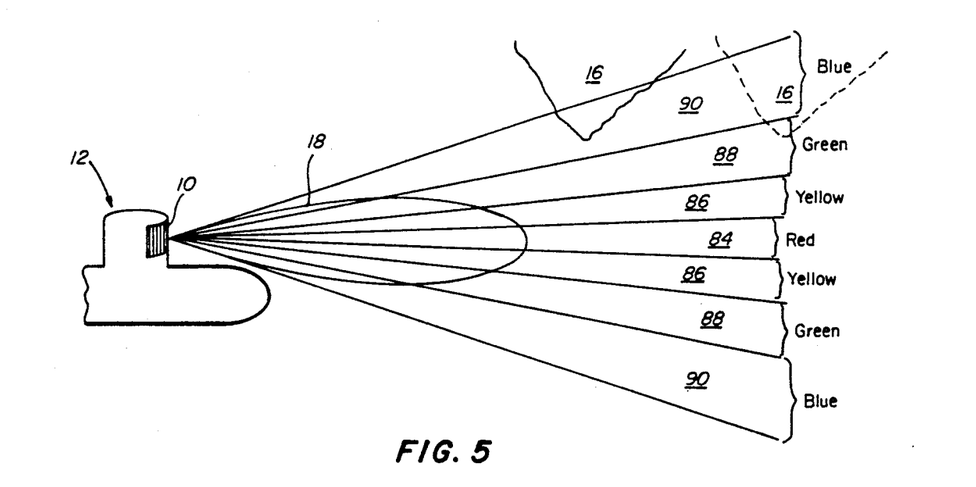
FIG. 5 is an elaboration of FIG. 4 in which the arcs of elevation angles are color designated in accordance with the invention.

Referring to FIG. 5, a portion of submersible 12 with array 10 is shown. Directivity pattern 18 is divided for illustration purposes into elevation angle arcs that are representatively color coded in accordance with the invention. Overhanging object 16, shown in ghost lines, passes from green arc 88 to blue arc 90 as submersible 12 advances toward object 16. An operator of submersible 12 would note this transition on his color monitor as a color change of object 16 from green to blue.

As stated in the Summary of the Invention, as the operator approaches overhanging object 16, the elevation angle from submersible 12 to object 16 will increase and the strength or amplitude of the reflected echoes will decrease. Where a first color such as red represents returned reflections of highest amplitude from objects at an elevation angle that pose a first or highest degree of threat of collision of transiting submersible 12 with object 16, and second, third and fourth colors such as yellow, green and blue represent respectively returned reflections of lesser amplitude and posing correspondingly lesser degrees of threat of collision of the transiting submersible with the object, the transition from green to blue that the operator noted on his monitor would indicate that object 16 is posing lesser and lesser degrees of hazard to his craft and that it is passing over his head.

Figure 6:
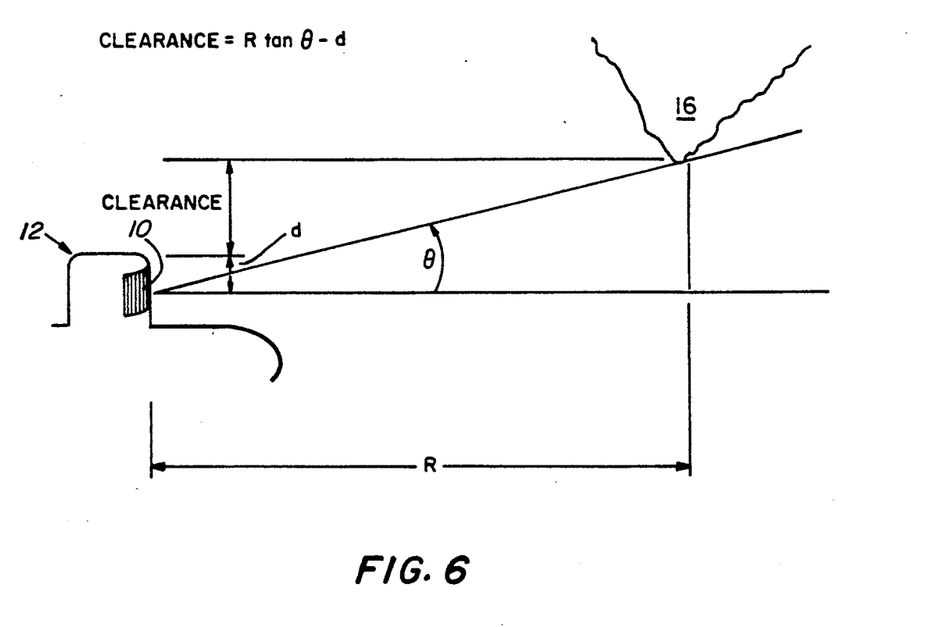
FIG. 6 illustrates factors used to determined object elevation according to the "fade range" technique.

Referring to FIG. 6, clearance between object 16 and submersible 12 may be determined by the "fade range" technique known to sonar operators. Using this technique, the operator observes when the display of the object fades from one color to another, for instance from blue to black. At this instance the operator takes the range of the object. Though the displayed color bands may actually indicate objects within a "band" of elevation angles, the fade or transition between colors can be adjusted to occur at a precise, known range and elevation.

This adjustment would be made by the operator changing the gain of his sonar so that the object fades from one color to another at a preselected known elevation and range.

Once the fade occurs, the operator corresponds the known elevation angle with the range at which the fade occurs. As illustrated FIG. 6 the clearance ($R\tan\theta - d$), where R is range, $\theta$ is the elevation angle and d is the difference between the focus of hydrophone array 10 and the top of vessel 12, can be determined by using standard straight line geometry techniques.

Though the apparatus of the invention has been described as applicable to navigation under and around undersea objects, the invention could be modified within standard engineering principles to be applicable to air transit where a navigator wishes to fly around or over objects extending vertically into the airspace.

Obviously, this and other modifications and variations of the present invention are possible in light of the above teachings. It is therefore to be understood that within the scope of the appending claims the invention may be practiced otherwise than as specifically described.

We claim:

1. A method for determining and displaying elevation information on an object with respect to a platform comprising the steps of:

receiving radiant energy from an object within a region;

converting said received radiant energy into electrical signals, said electrical signals corresponding to the strength of said received radiant energy;

modulating said electrical signals to substantially reduce components therein due to non-elevation angle influences;

quantizing said modulated signals by sorting said signals into bands based upon signal strength and by assigning one of a plurality of distinct colors to each of said bands;

converting said bands into color display signals according to the colors assigned to the bands; and displaying said color display signals on a color monitor to reveal object elevation angle as distinct shades of color.

2. A method for determining and displaying elevation information on an object comprising the steps of:

receiving acoustic energy upon a hydrophone from an object within an underwater region;

converting said received acoustic energy into electrical signals, said electrical signals corresponding to the strength of said received acoustic energy;

modulating said electrical signals to substantially reduce components therein due to non-elevation angle influences;

quantizing said modulated signals by sorting said signals into bands based upon signal strength and by assigning one of a plurality of distinct colors to each of said bands;

converting said bands into color display signals according to the colors assigned to the bands; and displaying said color display signals on a color monitor to reveal object elevation angle as distinct shades of color.

3. A method for determining and displaying elevation information on an object as recited in claim 2 wherein the step of converting said received acoustic energy into electrical signals is performed by a hydrophone.

4. A method for determining and displaying elevation information on an object comprising the steps of:

irradiating a preselected sector of a region with radiant energy;

receiving reflections of said radiant energy from said object within said sector upon a radiant energy receiver;

converting said received reflections into electrical signals, said electrical signals corresponding to the strength of said reflected radiant energy;

modulating said electrical signals to substantially reduce components therein due to non-elevation angle influences;

quantizing said modulated signals by sorting said signals into bands based upon signal strength and by assigning one of a plurality of distinct colors to each of said bands;

converting said bands into color display signals according to the colors assigned to the bands; and displaying said color display signals on a color monitor to reveal object elevation angle as distinct shades of color.

5. A method for determining and displaying elevation information on an object with respect to a platform comprising the steps of:

irradiating a preselected sector of a region with radiant energy from a source of radiant energy;

receivign reflections of said radiant energy from said object within said sector upon a radiant energy receiver;

converting said received reflections into electrical signals, said electrical signals corresponding to the strength of said reflected radiant energy;

modulating said electrical signals to substantially reduce components therein due to non-elevation angle influences;

quantizing said modulated signals by sorting said signals into bands based upon signal strength and by assigning one of a plurality of distinct colors to each of said bands;

converting said bands into color video signals according to the colors assigned to the individual bands; and displaying said color display signals on a color monitor to reveal object elevation angle with respect to said platform as distinct shades of color.

6. A method for determining and displaying elevation information on an object as recited in claim 4 or 5, further comprising:

determining the range of said object;

translating the displayed color, indicating the elevation angle of the object, into the corresponding elevation angle; and calculating the elevation of said object as a function of the range of said object and the elevation angle of said object.

* * * * *